United States Patent [19]

Zondag

[11] 3,986,735
[45] Oct. 19, 1976

[54] METHODS FOR WELDING TWO METAL PIECES OF TUBING WITH THEIR ENDS TO EACH OTHER AND TO PIPE-LINES CONSISTING OF PIECES OF TUBING THUS WELDED TO EACH OTHER

[75] Inventor: Nicolaas Abraham Zondag, Roosendaal, Netherlands

[73] Assignee: Explosive Metal Working Holland B.V., Roosendaal, Netherlands

[22] Filed: June 7, 1974

[21] Appl. No.: 477,329

[30] Foreign Application Priority Data

June 8, 1973  Netherlands .................... 7307999

[52] U.S. Cl. .............................. 285/286; 285/55; 228/107
[51] Int. Cl.² ................ F16L 13/02; F16L 9/14; B23K 21/00
[58] Field of Search ............. 29/470.1, 470.2, 486, 29/421 E; 228/3, 4, 5, 60, 107, 108, 109, 2.5; 285/286, 55

[56] References Cited
UNITED STATES PATENTS
3,563,713  2/1971  Rudd ...................... 29/486 X;488

FOREIGN PATENTS OR APPLICATIONS
656,696  8/1951  United Kingdom ......... 285/111 WJ Primary Examiner—Al Lawrence Smith
Assistant Examiner—Margaret Joyce
Attorney, Agent, or Firm—Snyder, Brown & Ramik

[57] ABSTRACT

A method for welding two thick-walled metal pieces of tubing of a pipe-line to one another, in which at the joint to be formed between said pieces of tubing overlapping portions thereof extending radially over a small marginal portion of the wall thickness adjacent to the internal cavity of the pipe-line are bonded to each other by the explosion of an internal explosive charge and the portions of the pieces of tubing extending radially over the rest of the wall thickness thereof are thermally welded to one another.

10 Claims, 6 Drawing Figures

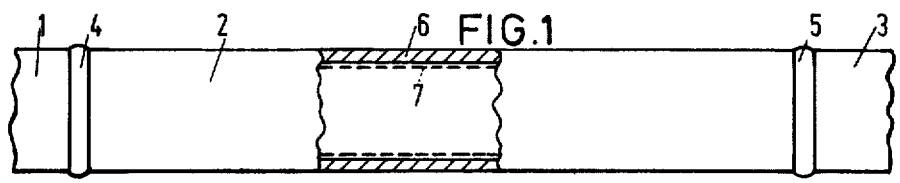
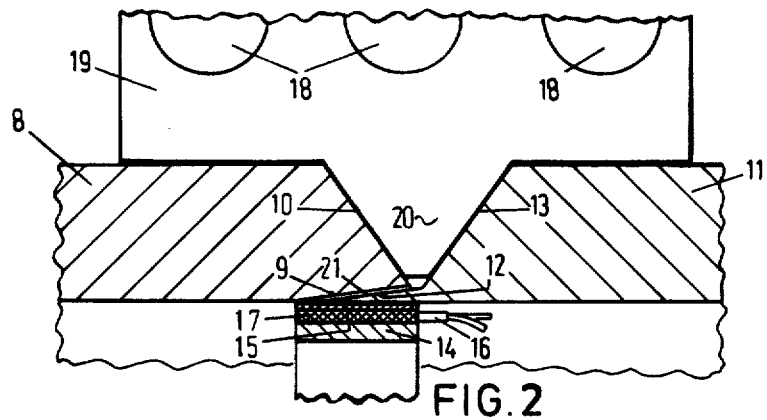
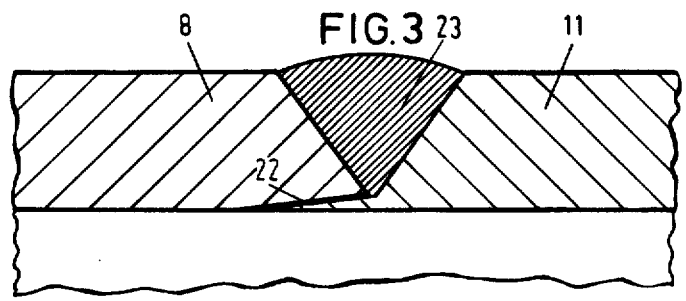
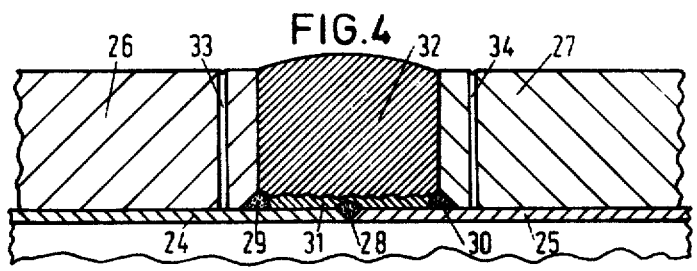

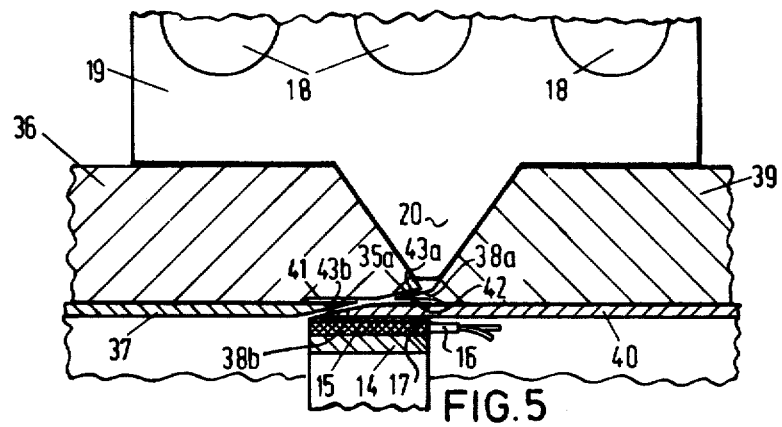
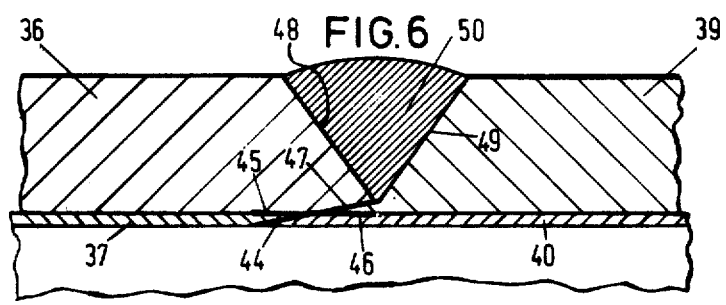

METHODS FOR WELDING TWO METAL PIECES OF TUBING WITH THEIR ENDS TO EACH OTHER AND TO PIPE-LINES CONSISTING OF PIECES OF TUBING THUS WELDED TO EACH OTHER

The invention relates to a method for welding with their ends to each other two relatively thick-walled metal pieces of tubing, e.g. parts of a pipe-line.

Pipe-lines composed of such pieces of tubing are among others used in the chemical industry and for the transport of mineral oil and natural gas. Welding the pieces of tubing to each other requires much care, time and skill, so that it is extraordinarily expensive. Expecially the so-called base weld, which is the weld to be made first between the pieces of tubing in a relatively small part of their wall thickness adjacent to the inner surface, offers difficulties which are very great, when the pieces of tubing are internally clad by a relatively thin layer of corrosion resisting metal, such as chromium steel with a high content of chromium, tantalium, titanium, zirconium and alloys of these metals. It is very difficult to weld such metals to each other or to other metals in a gas-tight manner by electricity or by means of a torch, so that, when normal welding methods are used, the percentage of leaking weld seams in high. In internally clad pieces of tubing, that means in pieces of tubing which each consist of a relatively thick-walled outer tube and a relatively thin-walled cladding tube of corrosion resisting metal provided against the inner surface of the outer tube, a leaking weld seam constitutes the danger that owing to the leakage of medium into the joint between the cladding tube and the outer tube in said joint a high pressure is produced which could compress the thin-walled cladding tube when the pressure in the pipe-line falls out. In order to prevent this one has provided the outer tube, in the vicinity of the weld, with pressure compensating passages which connect the joint referred to with the environ. However, these passages increase the risk of attack on the outer tube.

The invention provides for bonding the pieces of tubing, whether or not clad, of such a pipe-line to one another a method which removes all disadvantages of the known welding methods in a simple and relatively cheap way. This method comprises the steps of forming in the first piece of tubing at least at and near one end thereof a frustro-conical cavity connecting coaxially to the cylindrical cavity of said piece of tubing, said conical cavity extending over a portion of the wall thickness of said piece of tubing to said end thereof and diverging towards said end, bevelling said first piece of tubing from its outer surface to the outer edge of said conical cavity, forming on the other or second piece of tubing at least at and near one end thereof a coaxial frustro-conical end portion, said end portion extending over a portion of the wall thickness of the second piece of tubing and fitting the conical cavity of the first piece of tubing, bevelling said second piece of tubing from its outer surface to the edge of the base of said conical end portion, inserting an explosive charge of sufficient force to effect a bond between said two pieces of tubing into the cylindrical cavity of the conical end portion of the second piece of tubing, inserting the second piece of tubing with its conical end portion into the conical cavity of the first piece of tubing, the pieces of tubing being so formed and so positioned one in respect of the other as to ensure that a narrow gap is left between the surfaces of each pair of surfaces to be explosively bonded to each other, surrounding, if necessary, both pieces of tubing at the location of the bond by a supporting member which consists of a plurality of parts, exploding said charge, removing said supporting member, if used, and filling up by welding the circumferential groove bounded by the bevelled surfaces of the two pieces of tubing. If, furthermore, care is taken, that for the interconnection of internally clad pieces of tubing in one or the first piece of tubing a frustro-conical cavity is formed which extends over the entire thickness of the cladding tube and only over a part of the thickness of the outer tube of said piece of tubing and on the other or second piece of tubing a frustro-conical end portion is formed which fits the conical cavity of said first piece of tubing and extends over a part of the thickness of the outer tube and over the entire thickness of the cladding tube of the second piece of tubing, then a gas-tight gapless base bond is effected by one single explosion, when the welding method according to the invention is used, said base bond extending in internally unclad pieces of tubing over a part of the wall thickness adjacent to the inner surface thereof and consisting in clad pieces of tubing of gas-tight gapless bonds not only between the cladding tubes of both pieces of tubing but also between the end portion of the cladding tube and the outer tube of each individual piece of tubing and between both outer tubes. It has appeared, that this favourable result is almost independent of the used metals, so that also the most difficultly thermally weldable metals can be used for the cladding tubes. The weld normally formed by electricity or with the aid of a torch in the circumferential groove between the pieces of tubing or the outer tubes thereof does not serve for the purpose of obtaining a gas-tight seal but for the mechanical interconnection of the pieces of tubing. This weld does not raise difficulties, since after forming the base bond the metal of the pieces of tubing or the outer tubes thereof can be easily welded.

Consequently a pipe-line formed in accordance with the invention consists of pieces of tubing, whether or not internally clad, which are welded to each other and in which in each joint between two adjacent pieces of tubing thereof one or the first piece of tubing fits with a frustro-conical cavity over a frustro-conical end portion of the other or second piece of tubing and all surfaces facing each other in the region extending between the ends of said cavity and said end portion are bonded to each other in a gas-tight manner by means of an explosion caused in the cylindrical cavity of the conical end portion and in which the circumferential groove formed between both pieces of tubing and originally opening towards the cylindrical outer surface of the pieces of tubing has been filled up by welding.

Preferably the apex angle of the frustro-conical cavity of one piece of tubing and that of the frustro-conical end portion of the other piece of tubing engaging said conical cavity are made acute. Due thereto in each joint a relatively long overlap and a long joint are obtained which are at a small angle with the axis of the pipe-line, so that the radial pressure caused by the explosion has a great effect on forming the bond and owing thereto less explosive force is necessary to close the joint or joints in a gas-tight and gapless manner.

Also a structure is recommended, in which of two adjoining internally coated piece of tubing of the pipeline the frustro-conical cavity of one piece of tubing and the frustro-conical end portion of the other piece of tubing engaging said cavity extend over a portion of the outer tubes of which the thickness is equal or substantially equal to that of the cladding tubes of the pieces of tubing. In that case sufficiently long bonds between the cladding tube and the outer tube of each individual piece of tubing and between the outer tubes of both pieces of tubing are obtained. When the thickness, over which said cavity and said end portion extend, is made greater, it is necessary to use a stronger explosive charge in order to achieve the same result, which, however, could lead to damage of the pieces of tubing.

The invention will be further elucidated with the aid of the drawing. Therein is:

FIG. 1 partly an elevational view, partly an axial sectional view, on a small scale, of a portion of a pipe-line consisting of pieces of tubing interconnected by welding, FIG. 2 on a real scale a portion of an axial sectional view of two coaxially positioned, internally clad pieces of tubing just before they are bonded to one another with the method according to the invention, FIG. 3 on a real scale the portion of the axial sectional view shown in FIG. 2, after the pieces of tubing have been welded to one another, FIG. 4 on a real scale a portion of an axial sectional view of a pipe-line at the joint of two internally clad pieces of tubing of said pipe-line welded to each other in a known way, FIG. 5 on a real scale a portion of an axial sectional view of two coaxially positioned, internally clad pieces of tubing, just before they are bonded to each other in the manner according to the invention, and FIG. 6 on a real scale the portion of the axial sectional view shown in FIG. 5, just after the pieces of tubing have been bonded to each other.

In FIG. 1 pieces of tubing of a pipe-line welded to one another at 4 and 5, e.g. a pipe-line for the transport of mineral oil from wells in the sea to dry land, are designated by 1, 2, 3. Such pieces of tubing consist each of a relatively thick-walled tube 6 of steel (for a pipe-line having an internal diameter of 150 mm for instance a tube having a wall thickness of 23—25 mm). For the transport of natural gas or of liquid or gaseous chemical products the tube 6 may be clad by the relatively thin-walled cladding tube 7 shown in dashed lines. Said cladding tube may have a wall thickness of 1-2 mm and may be made of corrosion resisting metal, such as chromium steel with a high content of chromium, tantalium, titamium or alloys of such metal, etc.

For welding unclad pieces of tubing to one another one follows the method illustrated in FIG. 2.

One piece of tubing 8 is provided at one end with a coaxial frustro-conical cavity 9 diverting towards the outside and extending only over a small part of the wall thickness of the piece of tubing which is bevelled at 10. The other piece of tubing 11 is provided with a frustro-conical end portion 12 fitting said cavity 9 and said piece of tubing is bevelled at 13. Also this end portion 12 extends only over a small portion of the wall thickness of the pieces of tubing 11.

After an annular explosive charge 15 provided on an annular support 14 and completed with an igniter 16 and a thin covering layer 17 has been inserted into the end portion 12, the pieces of tubing 8 and 11 are placed in the manner shown in FIG. 2 in a supporting block 19 consisting of two halves with holes 18 for fastening bolts. The length of said charge is equal to that of the conical cavity 9 and that of the conical end portion 12. The bevelled surfaces 10 and 13 then come to lie so against an internal rib 20 formed on the block 19 and having a triangular cross sectional area as to ensure that a narrow gap 21 is left between the conical surface of the cavity 9 and that of the end portion 12.

If thereupon the charge is fired a bond 22 is effected between the conical surfaces 9 and 12 (FIG. 3). This bond is gapless and gas-tight and forms the base bond which is so difficult to realize by using known welding methods.

After the detonation of the explosive chargge 15 the supporting block 19, 20 is removed and the circumferential groove bounded by the bevelled surfaces 10, 13 is filled up thermally, that means by electricity or a torch, with welding material 23. This welding material only serves the purpose of interconnecting the two pieces of tubing mechanically.

For pipe-lines consisting of internally clad pieces of tubing the cladding tubes 7 (FIG. 1) may be provided in the outer tubes 6 in different ways. To that end a cladding tube 7 may be clamped tight in the outer tube by expansion effected by rollers moved along a helical line or by a ball of somewhat greater diameter pulled through the cladding tube. It is also possible to bond the cladding tube 7 throughout its entire outer surface to the inner surface of the outer tube 6 by means of an internal explosive charge. To realize such a bond between the tubes 6 and 7 one could start with two short pieces of tubing, of which the diameters are too great and the wall thickness are a multiple of the required wall thicknesses. Care must then be taken that in order to form a narrow gap the outer diameter of the cladding piece of tubing is somewhat smaller than the inner diameter of the outer piece of tubing. Thereafter the cladding piece of tubing is bonded to the outer piece of tubing by firing an internal explosive charge, whereupon the composite piece of tubing is made much times longer by extrusion and reduced to the right diameters and wall thicknesses. This latter method, however, is complicated and expensive.

However, the first mentioned method for bonding the cladding tube 7 to the outer tube 6 has the disadvantage that a joint remains between the two tubes. The danger thereof is that, when the bond between two pieces of tubing of the pipe-line leaks, liquid or gas under high pressure can be forced into the joint between the cladding tube and the outer tube which results in that at the elimination of the pressure in the pipe-line the thin-walled cladding tube can be locally radially compressed so much that a considerable local contraction of the pipe-line occurs and/or the cladding tube cracks.

In order to reduce as much as possible the danger of a leaking weld seam in pieces of tubing having cladding tubes rolled in outer tubes it has already been proposed to weld the pieces of tubing of the pipe-line to one another in the manner shown in FIG. 4. To that end the cladding tubes 24, 25 are made so long that they project somewhat from the outer tubes 26, 27 and the cladding tubes 24, 25 are welded at 28 to each other. Thereupon the cladding tube 24 is welded at 29 to the outer tube 26 and the cladding tube 25 is welded at 30 to the outer tube 27. Thereafter a layer of cladding material 31 is welded on the projecting portions of the cladding tubes 24, 25 and finally the remaining circumferential groove is filled up at 32 by welding with welding material which is adapted to the metal of the outer tubes. All welding is done thermally that means electrically or by a torch. Since welding in this way of the corrosion resisting metals suitable for the cladding tubes is very difficult and requires special measures and care, the known welding bond is very expensive and, reckoning with the difficulties which one has to overcome during the welding operation, not so reliable that the joint between the tubes 24 and 26 and the tubes 25 and 27 is separated with certainty from the internal space of the pipe-line in a gas-tight manner. In order to prevent the creation of high pressures in the joints between the cladding tubes 24, 25 and the outer tubes 26, 27 pressure compensating passages 33, 34 have sometimes been used.

The disadvantages of the known welding bond shown in FIG. 4 can principally be avoided, when the method shown in FIGS. 2 and 3 is used. In that case it is only necessary that in the manner shown in FIG. 5 the frustro-conical cavity 35a, 35b of one piece of tubing consisting of the outer tube 36 and the cladding tube 37 and the frustro-conical end portion 38a, 38b of the other piece of tubing consisting of the outer tube 39 and the cladding tube 40 extends over the entire thickness of the cladding tubes 37, 40 and over a part of the thickness of the outer tubes 36, 39. Furthermore it is recommended to turn at 41 and 42 the outer tubes somewhat out, so that there gaps are formed between the cladding tubes and the outer tubes 36, 39. Also then the pieces of tubing 36, 37 and 39, 40 are so placed, after the holder 14 with the explosive charge 15, 16 and the covering layer 17 have been inserted into the piece of tubing 39, 40, in the supporting block 19, 20 as to form a gap 43a, 43b between the conical surfaces 35a, 35b and 38a, 38b.

If thereafter the charge 15, 16 is fired a bond 44, 45, 46, 47 is produced between the cladding tubes 37, 40, the cladding tube 37 and the outer tube 36, the cladding tube 40 and the outer tube 39 and between the two outer tubes 36, 39, respectively (FIG. 6). These four bonds obtained by one single explosion guarantee a gas-tight separation between the inner space of the pipe-line and the joints between the cladding tubes 37, 40 and the outer tubes 36, 39 and they form at the same time a base-bond between the pieces of tubing 36, 37 and 39, 40. The circumferential groove bounded by the bevelled surfaces 48, 49 of the outer tubes 36, 39 are again filled up thermally with welding material 50.

It will be apparent that the more acute the apex angle of the conical cavity 9 and 35a, 35b and of the conical end portion 12 and 38a, 38b is, the longer the overlap is or overlaps are and the more easily the bond 22 is and the bonds 44, 45, 46, 47 are produced.

What I claim is:

1. A method for welding with their ends to each other two relatively thick-walled metal pieces of tubing, e.g. parts of a pipe-line, said method comprising the steps of forming in a first piece of tubing at least at and near one end thereof a frustro-conical cavity connecting coaxially to the cylindrical cavity of said piece of tubing, said conical cavity extending over a portion of the wall thickness of said piece of tubing to said end thereof and diverging towards said end, bevelling said first piece of tubing from its outer surface to the outer edge of said conical cavity, forming on a second piece of tubing at least at and near one end thereof a coaxial frustro-conical end portion, said end portion extending over a portion of the wall thickness of the second piece of tubing and fitting the conical cavity of the first piece of tubing, bevelling said second piece of tubing from its outer surface to the edge of the base of said conical end portion, inserting an explosive charge of sufficient force to effect a bond between said two pieces of tubing into the cylindrical cavity of the conical end portion of the second piece of tubing, inserting the second piece of tubing with its conical end portion into the conical cavity of the first piece of tubing, the piece of tubing being so formed and so positioned one in respect of the other as to ensure that a narrow gap is left between the surfaces of each pair of surfaces to be explosively bonded to each other, surrounding both pieces of tubing at the location of the bond by a supporting member which consists of a plurality of parts exploding said charge, removing said supporting member and filling up by welding the circumferential groove bounded by the bevelled surfaces of the two pieces of tubing.

2. A method as claimed in claim 1 for welding with their ends to each other two pieces of tubing consisting each of a relatively thick-walled, metal outer tube and a relatively thin-walled, corrosion resisting, metal tube cladding the inner surface of said outer tube, said method comprising the additional steps of forming in the first piece of tubing a frustro-conical cavity which extends over the entire thickness of the cladding tube and only over a part of the thickness of the outer tube of said first piece of tubing and of forming on the second piece of tubing a frustro-conical end portion which fits the conical cavity of said first piece of tubing and extends over a part of the thickness of the outer tube and over the entire thickness of the cladding tube of the second piece of tubing.

3. The two-stage method of welding two tubular members together in end-to-end relation, which comprises the steps of:
    a. interfitting the two tubular members in end-to-end relation with an inner circumferential portion of one member projecting into the other member to define a circumferential gap therebetween and to define a groove between the two members outwardly of the interfitted portions;
    b. explosively welding said members together internally at their interfitted portions to close said gap and define a circumferentially complete, liquid and gas tight weldment at the root of said groove; and then
    c. mechanically joining said members by thermal weldment within said groove.

4. The method as defined in claim 3 which includes the steps, prior to step (b), of mechanically surrounding and supporting said members at their interfitted ends.

5. In a pipeline, the combination of:
    a pair of pipe sections disposed in end-to-end relation, one end of one section having an inner, circumferentially extending portion which is of minor thickness with respect to the thickness of said one section and which projects into one end of the other section and is joined thereto by explosive welding to define a gas tight root weld between said sections;
    the one end of said one section being beveled and the one end of said other section being beveled whereby the two ends define a groove therebetween; and
    thermal weldment means within said groove mechanically joining said two sections;

said one end of said one section being defined by a frusto-conical inner end edge and said one of said other section being provided with a frusto-conical inner surface receiving said end edge.

6. In a pipeline as defined in claim 5 wherein each section is provided with a section of corrosion resisting metal tubing cladding the inner surface thereof and joined by said explosive welding.

7. In a pipeline as defined in claim 5 wherein each section is provided with a section of corrosion resisting metal tubing cladding the inner surface thereof, the tubing in said one section extending to the extremity of said one end thereof partially to define said inner end edge, and the tubing in said other section forming a portion only of said frusto-conical inner surface.

8. The two-stage method of joining pipe sections in end-to-end relation which comprises the steps of:
 a. interfitting the two pipe sections in end-to-end relation and effecting a liquid and gas tight root weld in a minor radial thickness of the pipe sections by explosive welding; and then
 b. thermally welding the two pipe sections together over and around said root weld.

9. The method of joining two relatively thick-walled metal pieces of tubing, e.g. parts of a pipe-line endwise by explosive bonding, said method comprising the steps of forming in one piece of tubing at least at one end thereof a frusto-conical end cavity having an acute apex angle and connected with its top end coaxially to the cylindrical cavity of said piece of tubing, said frusto-conical end cavity extending over a minor inner portion of the wall thickness of said piece of tubing and diverging towards said end thereof, beveling said piece of tubing from its cylindrical outer surface to the outer edge of the base of said frusto-conical end cavity, forming on the other piece of tubing at least at one end thereof a coaxial frusto-conical end portion having an acute apex angle and surrounding the cylindrical cavity of said other piece of tubing, said end portion extending over a minor inner portion of the wall thickness of said other piece of tubing and fitting the frusto-conical end cavity of the first mentioned piece of tubing, beveling said other piece of tubing from its cylindrical outer surface to the edge of the base of said frusto-conical end portion, inserting an explosive charge for explosively bonding the two pieces of tubing with their frusto-conical surfaces together into the cylindrical cavity of the conical end portion of said other piece of tubing, inserting said other piece of tubing with its frusto-conical end portion into the frusto-conical end cavity of the first mentioned piece of tubing and so relatively positioning said pieces of tubing as to ensure that a narrow gap is left between their frusto-conical surfaces to be explosively bonded, firing said charge and filling up by thermal welding the circumferential groove bounded by the beveled surfaces of the two pieces of tubing.

10. The method as claimed in claim 9 of joining two pieces of tubing endwise by explosive bonding, said pieces of tubing consisting each of a relatively thick-walled metal outer tube and a relatively thin-walled corrosion resisting metal inner tube cladding the inner surface of said outer tube, said method comprising the additional steps of forming in the first piece of tubing a frusto-conical end cavity which extends over the entire thickness of the cladding tube and only over a minor part of the thickness of the outer tube of said first mentioned piece of tubing and of forming on the other piece of tubing a frusto-conical end portion which fits the conical end cavity of said first mentioned piece of tubing and extends over a minor part of the thickness of the outer tube and over the entire thickness of the cladding tube of the other piece of tubing.

* * * * *